United States Patent

Zuppero et al.

[11] Patent Number: 5,593,509
[45] Date of Patent: Jan. 14, 1997

[54] PORTABLE THERMO-PHOTOVOLTAIC POWER SOURCE

[75] Inventors: Anthony C. Zuppero; Barton Krawetz; C. Rodger Barklund; Gary D. Seifert, all of Idaho Falls, Id.

[73] Assignee: Lockheed Idaho Technologies Company, Idaho Falls, Id.

[21] Appl. No.: 406,236

[22] Filed: Mar. 17, 1995

[51] Int. Cl.$^6$ .................................................. H01L 31/058
[52] U.S. Cl. ........................................................ 136/253
[58] Field of Search ............................................. 136/253

[56] References Cited

U.S. PATENT DOCUMENTS

| | | | |
|---|---|---|---|
| 4,331,829 | 5/1982 | Palazzetti et al. | 136/253 |
| 4,584,426 | 4/1986 | Nelson | 136/253 |
| 4,707,560 | 11/1987 | Hottel et al. | 136/253 |
| 4,883,619 | 11/1989 | Diederich et al. | 264/60 |
| 4,975,044 | 12/1990 | Diederich | 431/110 |
| 5,057,162 | 10/1991 | Nelson | 136/253 |
| 5,312,521 | 5/1994 | Fraas et al. | 136/253 |
| 5,356,487 | 10/1994 | Goldstein et al. | 136/253 |
| 5,360,490 | 11/1994 | Nelson | 136/253 |
| 5,383,976 | 1/1995 | Fraas et al. | 136/253 |

OTHER PUBLICATIONS

*International Solar Energy Intelligence Report*, Jul. 11, 1994.
*Mechanical Engineering–CIME*, Sep.1994.
"Developing New Miniature Energy Systems" *Mechanical Engineering—CIME*, vol. 116, No. 9, p. 82 (1994).

*Primary Examiner*—Aaron Weisstuch
*Attorney, Agent, or Firm*—Thorpe North & Western

[57] ABSTRACT

A miniature thermo-photovoltaic (TPV) device for generation of electrical power for use in portable electronic devices. A TPV power source is constructed to provide a heat source chemical reactor capable of using various fuels, such as liquid hydrocarbons, including but not limited to propane, LPG, butane, alcohols, oils and diesel fuels to generate a source of photons. A reflector dish guides misdirected photon energy from the photon source toward a photovoltaic array. A thin transparent protector sheet is disposed between the photon source and the array to reflect back thermal energy that cannot be converted to electricity, and protect the array from thermal damage. A microlens disposed between the protector sheet and the array further focuses the tailored band of photon energy from the photon source onto an array of photovoltaic cells, whereby the photon energy is converted to electrical power. A heat recuperator removes thermal energy from reactor chamber exhaust gases, preferably using mini- or micro-bellows to force air and fuel past the exhaust gases, and uses the energy to preheat the fuel and oxidant before it reaches the reactor, increasing system efficiency. Mini- or micro-bellows force ambient air through the system both to supply oxidant and to provide cooling. Finally, an insulator, which is preferably a super insulator, is disposed around the TPV power source to reduce fuel consumption, and to keep the TPV power source cool to the touch so it can be used in hand-held devices.

51 Claims, 10 Drawing Sheets

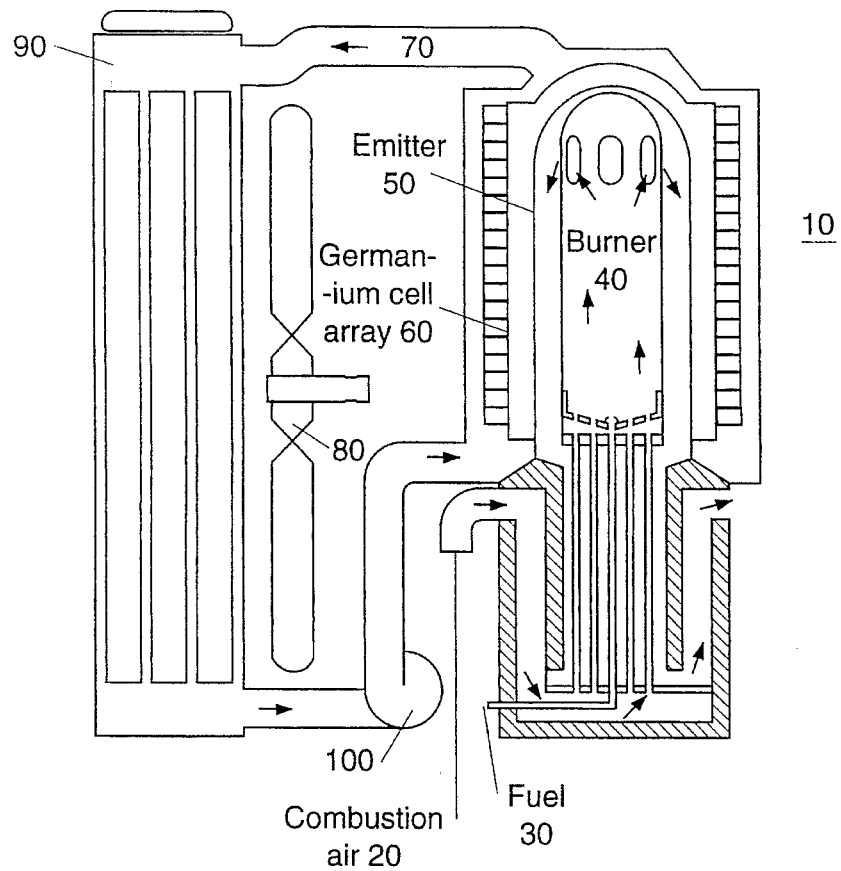
Figure 1: Prior Art
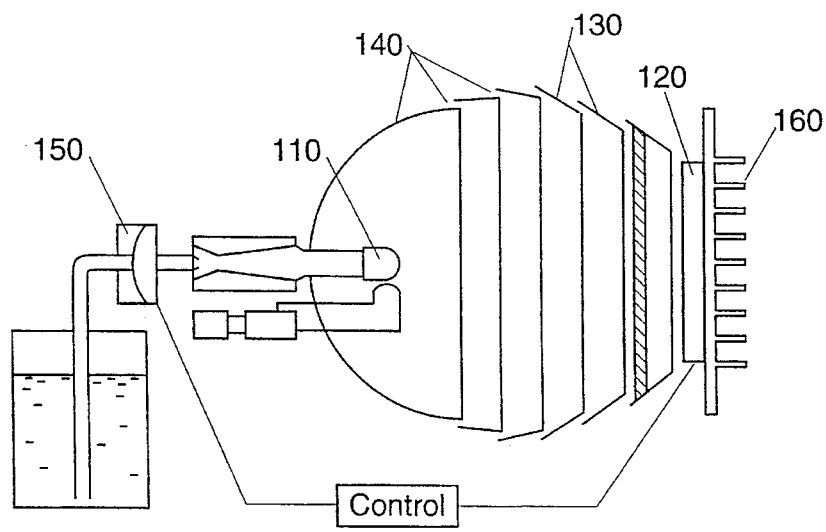
Figure 2: Prior Art

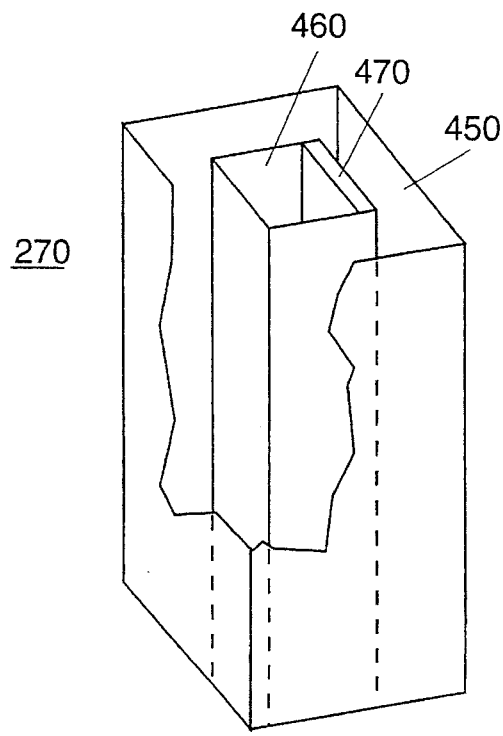
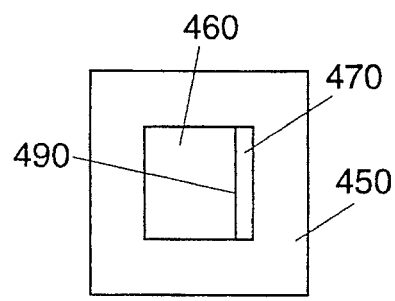
Figure 6B
Figure 6A
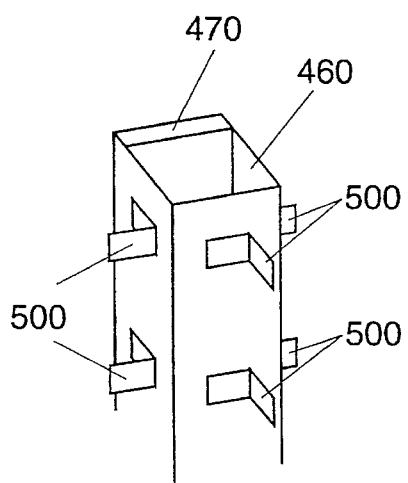
Figure 7

PORTABLE THERMO-PHOTOVOLTAIC POWER SOURCE

CONTRACTUAL ORIGIN OF THE INVENTION

The United States Government has rights in this invention disclosed under contract number DE-AC07-94ID13223 with Lockheed Idaho Technologies Company.

BACKGROUND OF THE INVENTION

1. Field of the Invention

This invention pertains to a small and portable power source, and specifically pertains to a thermophotovoltaic power source that generates heat bringing an emissive spectrum converter to incandescence and thereby producing light in a narrow wavelength spectrum to which nearby photovoltaic cells are particularly sensitive, generating electricity to power portable and hand-held devices which require significant amounts of energy but are presently limited in use because of the low energy densities provided by conventional power sources.

There are a variety of civilian and military situations which would benefit from a portable power source that can supply larger amounts of energy over extended periods of time than conventional batteries. Electronic surveillance systems, robotics, communications and computing devices all have very limited periods of usefulness when they are mobile or must necessarily be disconnected from power grid connections. A power source capable of delivering higher energy densities would not only provide extended life for the systems above, but would enable other devices requiring higher input energies to operate remotely.

2. Prior Art

Our increasing abilities to make use of electronics technology has created a need for being mobile with our technological devices. As technology advances, these devices become capable of accomplishing more tasks. However, portable devices have limited use because conventional batteries quickly lose their charge. Furthermore, our mobil society has only increased our desire to be able to handle any task requiring technology, no matter where we are. Consequently, devices are developed to provide remote location capabilities that can rival those of a home or office. Nevertheless, with increased capability comes the inevitable increase in power requirements. Unfortunately, portable power for devices such as cellular phones, notebook computers, power tools, toys, medical equipment, radios, pager, backup power supplies and robotic applications has always meant batteries. Batteries come in many shapes and sizes, but share several characteristics which limit their use.

For example, alkaline, nickel-cadmium and nickel-metal hydride batteries commonly used in the above mentioned devices all depend upon chemical energy being converted into electrical potential energy. The energy density of these batteries is low so as to prevent or limit the explosive discharge of energy if the battery cells should be ruptured, compressed or heated. Although it is possible to create better batteries, tests show that batteries with an energy density similar to that of explosives tend to act like high explosives when mistreated.

Low energy density translates into a battery providing a small amount of power over a relatively short time period for the user. But there are other drawbacks to conventional batteries as well. Even if the battery can be recharged, the time it takes to recharge is probably time lost being unproductive, especially when the batteries must be returned to a home site for charging. Adding to the problem is the cost of equipment necessary for recharging. Furthermore, the shelf-life of batteries is also only a matter of years, and batteries can lose their charge while waiting to be sold. Another realistic concern these days is the environmental impact of disposed batteries and the corrosive elements that leak during decomposition.

Attempts have been made to provide more efficient portable power sources that do not suffer from all the drawbacks of batteries. Most of the attempts have focused on improving features of batteries themselves, such as substituting the chemicals storing energy. Other alternative power sources have been developed for commercial use, but have not been miniaturized to replace batteries because of technological barriers that have, until now, prevented this action. Such a power source is thermophotovoltaic (TPV) technology.

TPV power is generated by elevating a radiant emitter to incandescent temperatures. The radiant energy is captured on semiconductor photovoltaic converter arrays (solar cells) and converted directly into electrical power to be stored or used immediately. While this principle of operation sounds simple enough in macro applications, the problems of miniaturization have prevented anyone, as far as the inventors of the present invention are aware, of developing and successfully implementing a miniaturized TPV power source.

For example, up to the present time, TPV devices have been limited exclusively to macro-applications. That is, the size of the TPV power sources has been relatively large. TPV power sources have been proposed for such tasks as generating energy to be stored for household purposes. A TPV device could be used to provide lighting and heat water, and the electrical energy produced as a by-product of the process could be stored in batteries and accessed for use by household appliances such as a heating fan.

The basic elements of a TPV power source have largely but not exclusively consisted of what will be referred to as a power chamber. A power chamber comprises a heat source reactor, an emissive spectrum converter (ESC), a photovoltaic element (PV) and a starter means. Some TPV power sources have proposed the use of heat recuperators.

A further description of the workings of TPV power generation is helpful in understanding the prior art, and provides a basis for understanding the present invention. A heat source reactor is any heat source capable of generating sufficient heat to bring to incandescence a narrow band thermal emitter. A thermal emitter, or emissive spectrum converter, when glowing hot will ideally be constructed to emit the majority of light in a narrow band, thus converting heat energy to light energy in a narrow spectrum. This is useful because the radiation is directed to a semiconductor photovoltaic material such as silicon. A semiconductor with a pn junction creating a potential barrier gives rise to a band gap that is a function of the material used. Silicon, with a band gap in electron volts of about 1.1 eV is equivalent to a wavelength of about 1150 nanometers. The more radiation that can be focused on the photovoltaic material with energy of 1.1 eV, the more electricity the photovoltaic material will produce. Of course, not all the heat energy will be usefully transferred to the photovoltaic material. This excess energy is lost as heat and in photons aimed away from the PV cells. An efficient TPV power source will capture excess heat in a recuperator and use this energy to precondition air acting as an oxidant and the fuel being fed to the heat source reactor.

Addressing specific embodiments of TPV technology, several U.S. Patents describe the major areas of advancement to date. For example, U.S. Pat. No. 4,584,426 teaches how "blackbody" radiation sources, such as the sun, are inefficient for producing the particular wavelength of light required by silicon photovoltaic power cells to produce electricity because the sun is a broadband radiation emitter. The patent teaches how a gas mantle can be prepared with a rare earth oxide such that when heated to incandescence, the mantle not only produces the majority of its light in a narrow band wavelength, but the spectrum is centered around that wavelength which is necessary for optimal production of electricity by silicon photovoltaic cells. The patent is typical of the macro-technology to which TPV technology has been applied.

Another example of TPV technology is the recuperator shown in U.S. Pat. No. 4,707,560 which teaches how preheat of the oxidant (air) can reduce the flame temperature required to heat the emissive spectrum converter. This makes the TPV device more efficient and slows the rate of fuel consumption.

Many improvements of macro TPV technology have concentrated on making a better gas mantle which is impregnated or coated with the rare earth oxides, such as U.S. Pat. Nos. 4,883,619, 4,975,044, and 5,057,162. Another macro improvement includes a ceramic fiber matrix heat source and emissive spectrum converter as taught by U.S. Pat. Nos. 5,356,487 and 5,360,490.

The overriding commonality between all of the patents described, and all others found by the inventors, is that TPV power sources are macro devices. That is to say that the physical dimensions of the components that comprise the power chamber are relatively large because the applications for which they were designed are household appliances such as hot water heaters and household electric power generators. The substantial technological problems of adapting TPV technology to micro-technology have until now precluded such adaptation.

What is needed is a way to provide portable power that has the lower energy density and safety of oil, but effective energy density greater than high explosives. The higher energy density would result not only in higher power output, but power output sustained over a longer period of time. In addition, a longer and preferably infinite shelf-life would result in less waste of resources, further reducing the impact of portable power use on the environment. Virtually instantaneous recharging of the power source would also be a definite advantage, as well as the elimination of equipment necessary for recharging. The power source should be compact and lightweight to replace batteries, and yet be rugged devices that would not suffer from the potential problems of high energy density power sources if mishandled. Finally, a wider range of fuel sources should be useable with the TPV power source.

As the above situations imply, it would also be an advantage over the prior art TPV power sources if the elements of the power chamber were miniaturized and ruggedized. It would also be an improvement over conventional batteries if a TPV power source could replace them without requiring more space than is currently occupied by the batteries, thus eliminating the cost of retrofitting portable devices for TPV power, and yet provide substantially greater energy that will last for a longer period of time.

OBJECTS AND SUMMARY OF THE INVENTION

It is an object of the present invention to provide a miniaturized thermophotovoltaic device.

It is also an object of the present invention to provide a heat source chemical reactor that can produce temperatures sufficient to cause emissive spectrum converter incandescence, and yet safely be held in a hand.

It is another object to provide a TPV power source with efficiency of at least 10 percent.

It is still another object to provide a heat source chemical reactor that can generate heat from a variety of alcohols, oils or diesel fuels.

It is yet another object to provide a heat source chemical reactor that is surrounded by a super insulator such that the TPV power source can be safely used in a hand-held device.

It is still another object of the present invention to construct a miniaturized heat source chemical reactor capable of providing 30 watts of thermal power.

It is also an object of the present invention to provide a miniature TPV power source that has a virtually infinite shelf life.

It is still another object of the present invention to provide a heat recuperator that uses air to cool exhaust gases and will preheat air for insertion in the heat source reactor chamber.

It is a further object to provide a system of micro-lensing to focus and channel usable light from the ESC to a photovoltaic cell.

It is yet a further object of the present invention to use diamond film coatings, or their thermally conducting equivalents, to transfer exhaust gas heat energy to cold fuel and air to improve efficiency of the power source.

Another object of the present invention is to construct multiple TPV devices on application specific integrated circuits (ASICs) such that power output may be controlled when energy requirements of the power change.

Yet another object of the present invention is a TPV device power source that can produce at least 3 watts of electrical power.

It is finally another object of the present invention to provide an air transport means for pushing or pulling air through the TPV system.

These and other objects not specifically recited are realized in a specific illustrative embodiment of a miniature thermophotovoltaic device for generation of electrical power for use in portable electronic and mechanical devices. In a preferred embodiment, a TPV power supply is constructed of miniaturized components to provide a heat source chemical reactor capable of using various alcohols, oils and diesel fuels to generate heat sufficient to bring an ESC coating to a burner to incandescence. A reflector dish cupping the burner redirects photon energy toward the photovoltaic array. A micro-lens focuses the narrow band light from the ESC on an array of photovoltaic cells, whereby the photon energy is converted to electrical power. The photovoltaic cells are protected from the heat energy of the ESC by a thin diamond coated transparent boundary which feeds excess heat energy back to a heat recuperator. The heat recuperator uses the excess heat energy to preheat the reactor oxidant and fuel, thereby increasing system efficiency.

Substantial advancements in microgears, micropumps and micro heat transfer devices enable the preheated fuel and air to be forced at some positive overpressure into the heat source reactor while excess heat energy from their combustion is fed back into the reactor chamber.

Also disclosed is a method for power load following using a series of TPV power sources, which includes the steps of (i) providing a plurality of TPV devices and/or on a planar ASIC device, (ii) linking the TPV devices such that power output is the cumulative power output of each separate TPV device, and (iii) providing additional circuitry on the ASIC device to enable shutdown or reactivation of individual TPV devices depending upon the power load requirements.

DESCRIPTION OF THE DRAWINGS

The above and other objects, features, advantages and alternative aspects of the invention will become apparent from a consideration of the following detailed description presented in connection with the accompanying drawings in which:

FIG. 1 is an elevational cut-away view of a TPV generator as used in macro TPV power sources of the prior art.

FIG. 2 is an elevational cut-away view of a more advanced adaptation on the TPV generator of FIG. 1, showing that the burner and emitter have been combined as a gas mantle.

FIG. 6A is a cross-section perspective view of a heat recuperator in a preferred embodiment as would be incorporated in FIG. 5A, with FIG. 6B showing a top view of FIG. 6A.

FIG. 7 is a cross-section perspective view of an alternative embodiment of a heat recuperator of FIG. 6.

DETAILED DESCRIPTION OF THE INVENTION

Figure 3:
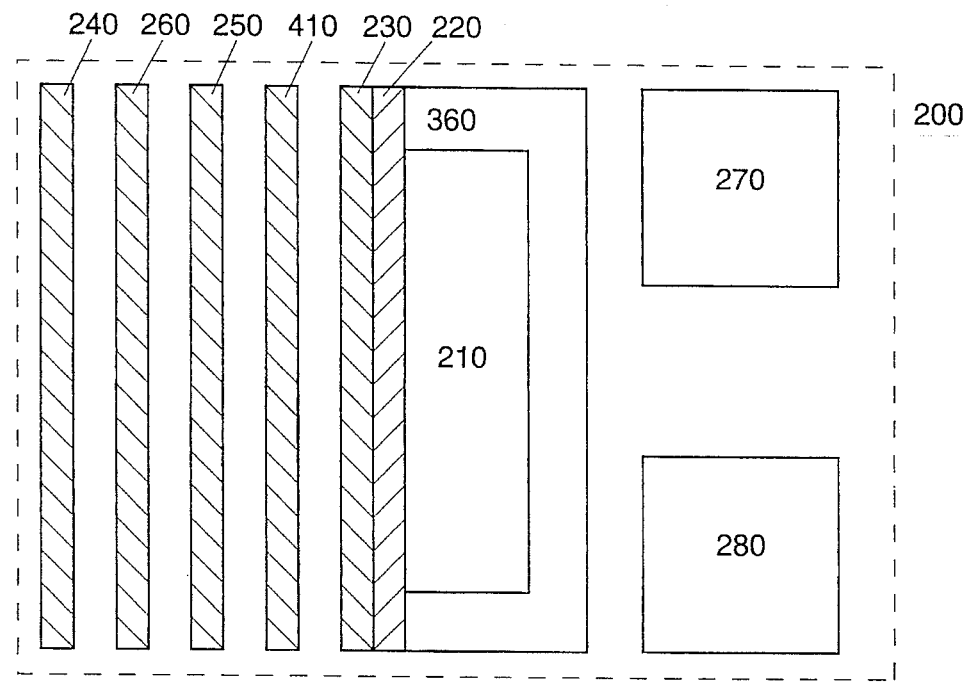
FIG. 3 is a block diagram of the elements of a TPV power chamber made in accordance with a preferred embodiment of the present invention.

FIG. 1 shows a macro thermophotovoltaic power generator 10 as taught in the prior art. As shown, the cross-sectional view illustrates the flow path of combustion air 20 and fuel 30 into a combustion chamber and burner 40. Surrounding but not in contact with the burner is an emitter 50 that is heated to incandescence. Surrounding the emitter 50 is an array of germanium photovoltaic cells 60 that generate electricity from the light produced from the incandescent emitter 50. A coolant fluid 70 flows around the photovoltaic cells 60 to prevent the excess heat not converted to electricity by the cells 60 from damaging the array.

What should be noted about the TPV power chamber (heat source reactor chamber and burner 40, emitter 50, photocells 60, cooling mechanism 70) is that the device shown is relatively large, and suitable for generating electric power in the range of 1000 watts. Such a design is unsuitable for use in the present invention for many reasons. For example, the coolant system 70 is bulky, requiring a fan 80 for cooling the radiator 90 through which coolant 70 flows, and a pump 100 for keeping the coolant 70 flowing. Such a design cannot be implemented for use in a portable or hand-held device.

FIG. 2 shows some improvements to the TPV power generation system of FIG. 1. One improvement is that the heat source reactor 110 has been reduced in size to a gas mantle. The mantle 110 is impregnated with a rare earth oxide radiator that when heated to incandescence provides a narrow spectrum radiation source. The light is focused on a photovoltaic array 120 by an aluminum reflector array 130 with air vents 140.

Unfortunately, this device cannot be significantly miniaturized nor used in a hand-held device. Gas mantle technology will not work because of the difficulty in creating a mantle that can withstand even mild stresses. While a process has been proposed to make gas mantles less susceptible to damage, the dimensions of gaps in the weave of current mantles is a significant fraction of the size of the total TPV device as envisioned. Furthermore, the macro TPV device generates significant heat, yet lacks substantial insulation, making it difficult to touch these prior art devices. Just as problematic is the lack of a means for forcing an oxidizer into the combustion chamber. A macro device does not require such an apparatus because natural airflow through vents is usually sufficient. The use of ordinary fuel pumps 150 is also sufficient for macro devices, but unworkable in a miniaturized TPV power system. Likewise, methods of protecting the photocells such as heat sinks 160 are inadequate in a miniaturized system because of the short distances between components.

FIG. 3 is a block diagram of the components in the TPV power chamber 200 in a preferred embodiment of the present invention. The power chamber 200 is the heart of the TPV power source and will be described first.

A starter means 280 is given a command to ignite a fuel and oxidant.

A heat source chemical reactor 210 (combustion chamber above) forms the core of the power chamber 200. The chemical reaction is the combustion of any appropriate fuel with air as the oxidant. The fuels envisioned for use in the present invention have high energy densities such as butane, propane, liquid petroleum gas (LPG), alcohols, oils and diesel fuels. A preferred fuel is butane. Butane has the advantage of providing a pressure sufficient to drive itself into the burner when stored at room temperature. Butane and air are burned in the reactor chamber 210 to generate heat typically between 1000 and 1500 degrees Celsius. This temperature is required to heat the burner 220 coated with an emissive spectrum converter (ESC) 230. The ESC 230 must be heated to incandescence where the radiated light gives off photon energy within a narrow bandwidth or wavelength.

An efficient TPV power chamber 200 will tailor the wavelength and therefore the energy of emitted photons from the ESC 230 to just above the band gap of the photovoltaic element 240. In doing so, the maximum amount of photon energy received by the photovoltaic 240 element is converted into electricity. Photon energy directed at the photovoltaic cells 240 too far below and above the band gap is wasted by heating the photovoltaic element 240, and this thermal energy is not easily recovered. Furthermore, this excess heat can damage or shorten the life of the photovoltaic cells 240.

Surrounding the heat source reactor chamber 210 is a super insulator 360. Such an insulator 360 is required by a miniature TPV power source for two reasons. In practical terms, the small physical dimensions of the burner 220 coated with the ESC 230 results in the burner 220 cooling rapidly. The super insulator 360 is used to retain heat within the heat source reactor chamber 210. The second reason is that the TPV power source is intended for portable or hand-held devices that must necessarily be cool to the touch.

To help concentrate the photon energy of the ESC, a reflector dish 410 is a possible addition to the system, but a possible tradeoff is the introduction of wider gaps between components. The dish 410 focuses photon energy that would otherwise not strike the photovoltaic element 240.

The photovoltaic element 240 of the present invention is protected by a transparent planar film 250. The film is transparent to allow photon energy from the ESC 230 to reach the photovoltaic element 240. The film 250 also protects the photovoltaic element 240 by reflecting excess heat energy above and far below the required band gap energy that would normally heat and possibly damage the photovoltaic cells 240. In addition, by reflecting the heat back to the ESC 230, the burner 220 and heat source reactor 210 can operate more efficiently.

It is possible that a very large amount of excess heat energy will be radiated by the ESC 230. If such is the case, a thin diamond coating, or thermally conducting equivalent, could be applied to the film 250 to provide additional heat sinking capabilities, and transfer heat back to a heat recuperator 270 for use in the system.

To help concentrate the photon energy of the ESC 230, a micro-lensing system 260 is also envisioned in which a lens 260 focuses the radiated photon energy from the ESC 230 on to the photovoltaic element 240, thereby reducing energy lost to heat and light refraction. The microlensing system 260 is also protected from the excess heat of the ESC 230 by the transparent thin film 250.

The photovoltaic element 240 in a preferred embodiment comprises an array of high efficiency photovoltaic cells made of silicon or some other semiconductor for conversion of the light from the ESC 230 directly to electricity. Photon energy of a particular wavelength that is absorbed in a semiconductor pn junction will give rise to an electric potential.

Finally, the heat recuperator 270 makes use of the heat energy of exhaust gases resulting from the combustion of fuel and an oxidant. This heat is channeled to the incoming fuel and oxidant inlet passages. By preheating fuel and an oxidant, the temperature of the heat source reaction chamber 210 will not be significantly reduced when the fuel and air are pumped into it. This results in less fuel being expended to maintain the chamber 210 at an average temperature sufficient to cause ESC 230 incandescence.

Figure 4:
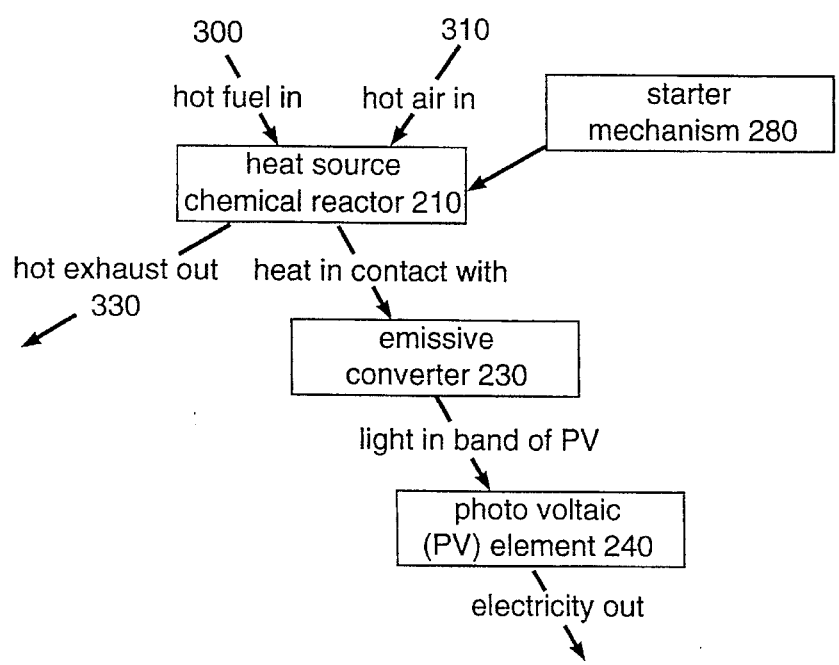
FIG. 4 is a flowchart of the basic operation of a thermophotovoltaic power chamber showing the inputs and outputs to the system described in FIG. 3.

FIG. 4 is a flowchart of the interactions described above between components of the TPV power chamber 200. A heat source reactor 210 receives as input a hot fuel 300 and hot air 310 (oxidant), having been preheated by the heat recuperator 270. The preheated fuel 300 and air 310 results in less fuel being required to heat the chamber 210 to approximately 1400 degrees Celsius. The fuel 300 and air 310 are ignited by a starter means 280 which provides an igniting spark or other combustion igniting means such as a glowing hot wire. Hot exhaust 330 is vented from the heat source reactor 210 and sent to the heat recuperator 270 (not shown). Heat from the reactor 210 warms a burner to incandescence, the burner being in direct contact with the ESC 230. At incandescence, the ESC 230 will radiate the majority of its photon energy at a particular band gap energy. The photon energy is just sufficient to create electron-hole pairs in the photovoltaic element 240. Electricity is the output of the PV element 240.

Figures 5A, 5B, 5C:
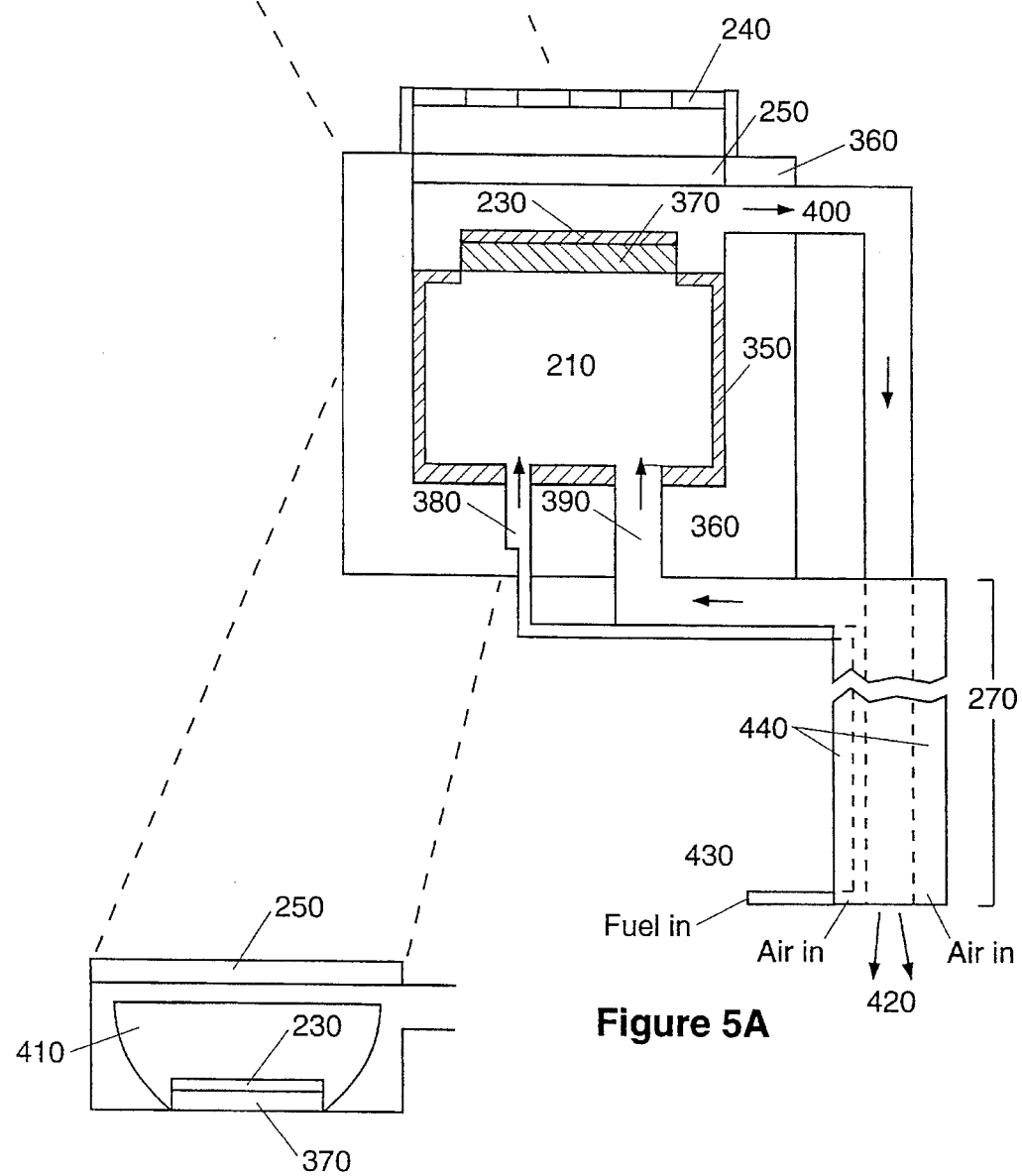
FIG. 5A is an elevational cross-section view of a TPV power chamber made in accordance with a preferred embodiment of the present invention.
FIG. 5B is an alternate embodiment showing a cross-section of a reflector dish added to the burner.
FIG. 5C is an alternate embodiment showing a cross-section of a microlens added between the protector sheet and photovoltaic array.

FIG. 5A is an elevational cut-away view of a TPV power chamber made in accordance with the preferred embodiment of the present invention. The heat source reactor chamber 210 has walls 350 comprised of a thermally resistant metal, metal alloy, or ceramic sufficient to contain the combustion process within. Immediately adjacent to the chamber walls 350 is a surrounding super insulator 360. The insulator 360 is comprised of the same materials used for the heat shield ceramic tiles on the space shuttles. These are sometimes called fibrous refractory composite insulation (FRSI) and High temperature Reusable Surface Insulation tiles (HRSI). The interesting property of this insulator 360 is that not only is the heat contained within the chamber 210 enabling the majority of the heat to be transferred to the ESC 230 coating the burner 370, but the outside surfaces of the insulator 360 will be cool to the touch despite the approximately 1400 degrees Celsius temperature within. The super insulator 360 will be of a thickness measured in millimeters.

The reactor chamber 210 has two inputs. The first input is a fuel inlet 380. In a preferred embodiment, butane is the fuel. To generate 30 watts of thermal power within the chamber 210, 0.000625 grams per second of butane must be burned. A small fuel pump outside of the power chamber will be described later that accomplishes this task.

The reactor chamber's 210 second input is an oxidant inlet 390. Using oxygen within air as the oxidant, air will be pumped into the chamber 210 and the fuel/air mixture will be burned to create the approximately 1400 degrees Celsius temperature required for ESC 230 incandescence.

Burning 0.000625 grams per second of butane requires approximately 10 cc of air per second to be pumped through the chamber 210. The air inlet 390 will necessarily be small, approximately 1 to 2 mm in diameter. Pushing this significant amount of air through such a narrow passage 390 requires the use of an air pump outside the power chamber 200 which will also be described later.

At the top of the reactor chamber 210 is the burner 370, and its dimensions are chosen based on the efficiency of the overall system and the desired power output. In a preferred embodiment of the present invention, the desired power output is 3 watts, although dimensions and specifications of the TPV power source can be varied to obtain more or less power. TPV devices today achieve three percent efficiency. Under these conditions, the reactor chamber 210 would have to produce 100 watts of thermal power. A "Goldstein" burner is claimed to produce 945 watts of power per square centimeter of burner. Nevertheless, using present day TPV devices, a square burner surface would be 3 mm on each edge at three percent efficiency. It is envisioned that the TPV system in the present invention will have efficiency of ten percent when using a heat recuperator. Therefore, the reactor chamber need only provide 30 watts of thermal power, resulting in a reduction of the square edge lengths of the square shaped burner to 1.7 mm.

Coating the burner 370 surface is the emissive spectrum converter (ESC) 230. Typically, a rare earth oxide 230 is coated directly onto the heat source, in this case the burner 370, to a depth less than 1 millimeter thick. By choosing the type of oxide carefully, the converter can be tailored to produce a very specific emission spectrum to match that of most known photovoltaic devices. This coating is well described in prior art.

Spaced a distance of approximately 1 mm from the top of the burner/ESC surface 370/230 in a preferred embodiment is a thin transparent planar protector sheet 250. The sheet 250 serves two purposes. First, the sheet 250 separates the region around the ESC 230 from the photovoltaic (PV) element 240. Hot exhaust gases 400 around the ESC 230 must be vented from the area to allow more air into the reaction chamber 210 for combustion, and the exhaust gases 400 will be used by the heat recuperator. Second, the sheet 250 reflects the spectral components not used by the PV element 240 back to the ESC 230, further helping to keep the ESC 230 incandescent and the whole device operating more efficiently. The gap between the planar sheet 250 and the ESC 230 of 1 mm may be adjusted depending upon the basis of heat loss resulting from pumping air through the system, and recuperation needs.

Spaced a distance of approximately 1 mm on the opposite side of the planar protector sheet is the PV element 240. This gap is chosen as a function of the size of the PV 240, and 1 mm is appropriate for a PV sheet 240 of a few square centimeters in area.

It should be noted that gaps up to 1 cm on either side of the planar protector sheet 250 may be appropriate, depending upon the heat recuperation needs, area of PV sheet 240 and air flow considerations. The principal constraint on gap width is interference with the optical transfer of energy from the ESC 230 to the PV element 240. The gap represents a geometric loss of light that would otherwise have gone to the PV element 240. Minimizing the gap will minimize photon energy loss, and increase efficiency of the overall system.

Although in the preferred embodiment described above the gaps between the ESC 230, the planar protector sheet 250 and the PV element 240 could be as small as 1 mm, there are alternative configurations and additional components that can provide enhancements to the power chamber design. For example, in the gap between the planar protector sheet 250 and the ESC 230, the gap could be widened to permit the insertion of a reflector dish 410 shown in FIG. 5B.

The dish 410 would concentrate photon energy from the ESC 230 and reflect it through the planar protector sheet 250, thereby reducing loss of misdirected photon energy. This dish would be centered around the burner and ESC coating 370/230 with an aperture where the bottom of the dish would normally be found, the aperture fitting around the burner 370. The interior surface of the dish 410 would be coated with a reflective material, such as aluminum to enhance its effectiveness.

A further enhancement of the TPV power chamber is the addition of a microlens 260 as seen in FIG. 5C. Most likely, a lens 260 would be placed in the gap between the planar protective sheet 250 and the PV element 240. The lens 260 would permit additional focusing and channeling of light on to the PV element 240, similar to the reflective dish 410. As with the insertion of the reflector dish 410, adjustments to the gap spacing, this time between the planar protective sheet 250 and the PV 250, might be necessary to place the microlens 260 in the system.

The array of photovoltaic (PV) cells 240 receiving the photon energy of the incandescent ESC 230 produces electricity. These devices are well known to those skilled in the art. Typically, silicon semiconductors are used because they are easy and inexpensive to manufacture. However, germanium might be substituted for silicon because of the similar band gaps (1.1 ev for silicon and 0.7 ev for germanium), and the ability to tailor wavelengths produced by the ESC by using different rare earth oxides and combinations thereof.

Finally, the heat recuperator 270 of the preferred embodiment is designed to utilize wasted heat energy. This element "recuperates" heat from the exhaust gas stream 400 by transferring heat to the fuel and air being pumped into the reactor chamber 210. The fuel and air are relatively "cold" if introduced directly into the reactor chamber 210 from a fuel reservoir and air intake. The result would be a cooling of the chamber 210. More fuel would then be required to maintain reactor chamber 210 temperature at ESC 230 incandescence, reducing efficiency of the system and increasing fuel consumption, thereby decreasing the time between fuel reloading. The recuperator 270 minimizes the cooling effect of fuel and air by passing heat from exhaust gases 400 to the fuel and air in the chamber 210 inlets 380 and 390, resulting in a higher average ESC 230 temperature. The added benefit of a heat recuperator 270 is the cooling of the expelled exhaust gases 400. Being used in portable or hand-held devices where the TPV power source might be held close to a person's face or hands, it is important that gases 400 are not expelled at the high temperatures found in the reactor chamber 210.

The design of the heat recuperator 270 is determined by the geometry of heat reactor inlets 380 and 390, and exhaust gases 400 output. Exhaust gases 400 leave the reactor chamber 210 through a single exhaust port 420. However, there are two input passages 430 and 440 that require heating. A preferred embodiment for the recuperator 270 is the counter-flow "chimney" design. The exhaust gases 400 are driven from the reactor chamber 210 through as long a shaft as possible. The longer the shaft, the more opportunity there is for heat to transfer. The shaft will be comprised of a highly thermally conductive material. At present, both metals and ceramics are envisioned as suitable heat exchanging materials. The more heat transferred from the exhaust gases to the fuel and oxidant, the more efficient the TPV power source will be.

Regarding specific geometry of the counter-flow chimneys, a preferred embodiment would be a "flat-plate" chimney design illustrated in FIG. 6A, where all the chimney surfaces are flat planes. The flat-plate design simplifies several construction features of the chimney. For example, although the outer shaft 450 for incoming air flow completely surrounds the inner exhaust gases shaft 460 thus providing the maximum amount of surface area for heat exchange between air and exhaust gases, there is the matter of where to place the much narrower fuel line 470 that also needs preheating. The fuel line 470 is necessarily narrower because the volume of fuel pumped to the reactor chamber 210 is significantly smaller than the volume of air. The inner shaft 460 in this preferred embodiment comprises a four sided shaft 460, but it should be realized that a number of sides could be used. The fuel line 470 is easily placed flush against a single outer side 490 of the inner shaft 460, being spread broadly against the shaft wall, and extending only a short distance into the inlet air flow path. Such a piggy-back configuration will only marginally reduce heating of the inlet air flow, allowing the substantial majority of exhaust heat to heat the inlet air. A slight modification to the design would be the addition of a diamond film coating around the outer wall 490 of the inner shaft 460. The coating would be extended to surround the fuel line 470 to provide even greater heat transfer. A further modification would be the replacement of the inner wall 490 separating the inner shaft 460 exhaust gases 400 and the fuel line 470. The highly conductive nature of the diamond film would allow even greater heat transfer. It should be noted that because the design does not need to operate under a severe pressure differential, structural constraints are minimal.

An alternative embodiment of the flat-plate counter-flow chimney design is illustrated in FIG. 7, and would be the addition of vanes 500 extending from the surface of the outer walls of the inner shaft 460 into the inlet air flow path. This modification increases the exchange of heat from the exhaust gases 400 to the air by forcing the air flow past a larger heated surface area. The vanes 500 are to be made of highly thermally conductive material. It is envisioned that the vanes will be comprised of diamond films or thermally similar material.

Figure 8:
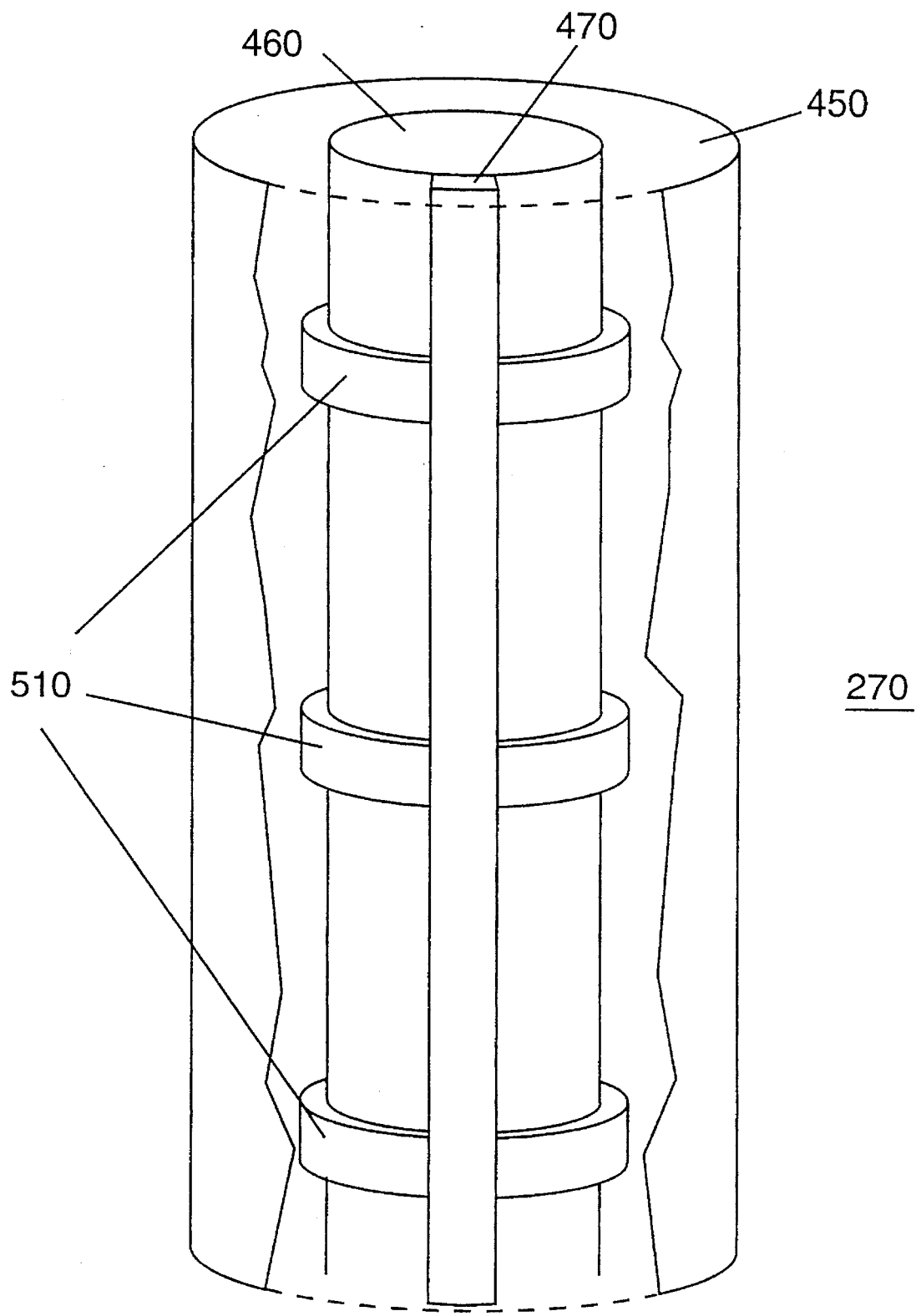
FIG. 8 is an elevational cross-section view of another alternative embodiment of the heat recuperator of FIG. 6.

Another alternative embodiment of the heat recuperator 270 would be the construction of a columnar counter-flow chimney design as shown in FIG. 8. This particular configuration is more of a design choice prompted by physical constraints of the device in which the TPV power source would be operating. A cylindrical design may prove advantageous, and does not unduly complicate the device. Instead of vanes extending out from flat sides of an inner shaft, annular rings 510 around the inner column 460 would increase the surface area in contact with the inlet air flow. The fuel line 470 would only cause a slight bump on the otherwise circular exhaust gases column 460.

Figure 9:
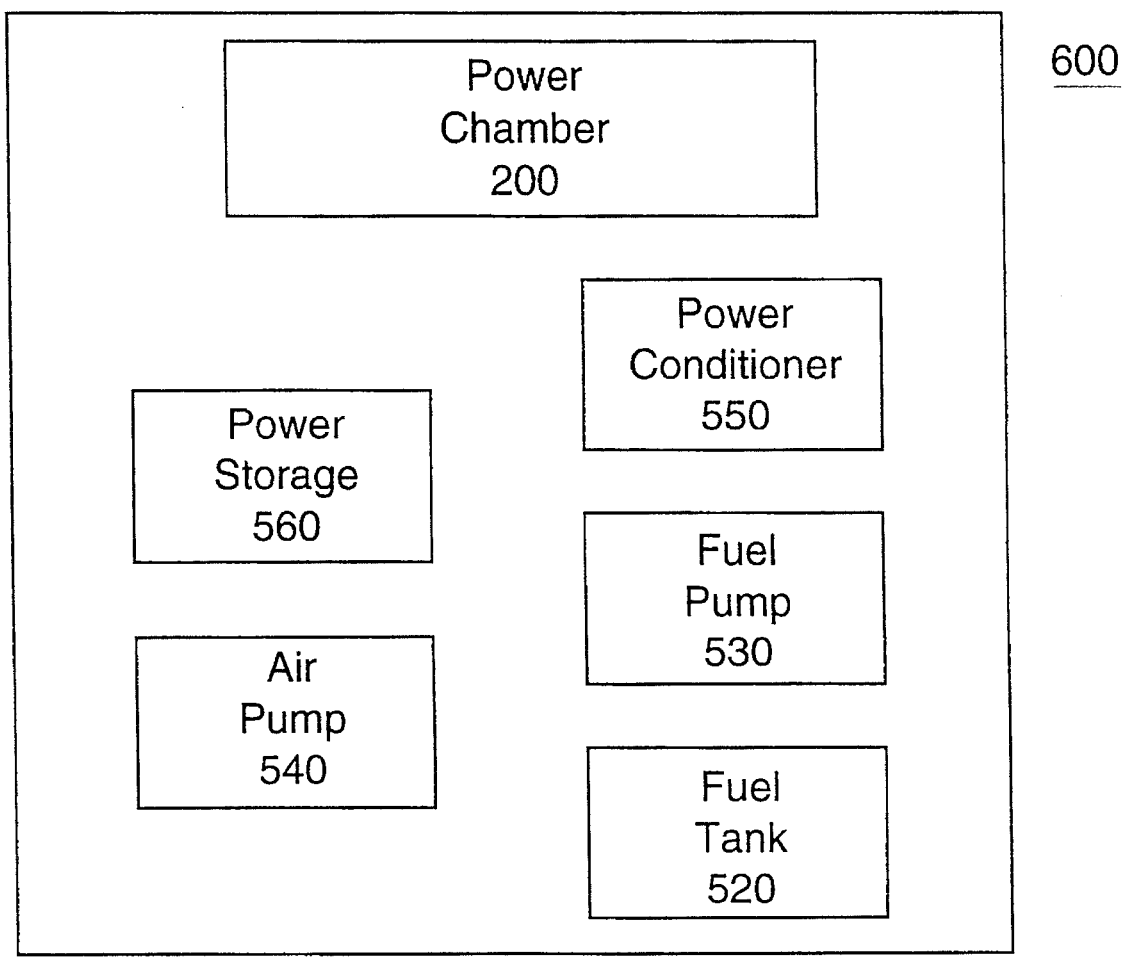
FIG. 9 is a block diagram of the additional components in a complete TPV power generation system.

FIG. 9 is a block diagram of the additional TPV system 600 components in a complete power generation system. The power chamber 200 has been described in FIGS. 3–8. The additional components shown in the block diagram are necessary for the construction of a miniature TPV power source 600, and introduce new issues of novelty of the present invention. The fuel tank 520 may be filled with a variety of different fuels such as butane, propane, LPG, and various other alcohols, as well as oils and diesel fuels. Butane is the fuel of a preferred embodiment because of the pressure it provides to assist the fuel pump 530.

The fuel pump 530 and air pump 540 have been mentioned before, and will be described in detail in FIGS. 11 to 15. The final two elements of a complete TPV power source 600 are a power conditioner 550 and power storage device 560.

The power conditioner 550 serves the function of providing clean energy free of power spikes and drops. It also serves the purpose of adjusting power output of the TPV system 600 by sensing load changes. For example, if the device being powered by the TPV energy source 600 such as a notebook computer activates a hard drive, the load will increase. To handle the load, additional TPV power chambers 200 would be started until sufficient energy to handle the load was produced. Likewise, when power demands drop when the hard drive spins down, it is better to deactivate power chambers 200 and save fuel rather than waste fuel if the power storage device 560 is already fully charged.

The power storage device 560 enables the TPV power source 600 to supply energy, for example, during times of refueling of the fuel tank 520 and when power demand increases sharply and additional TPV chambers 200 are heating up.

Figure 10:
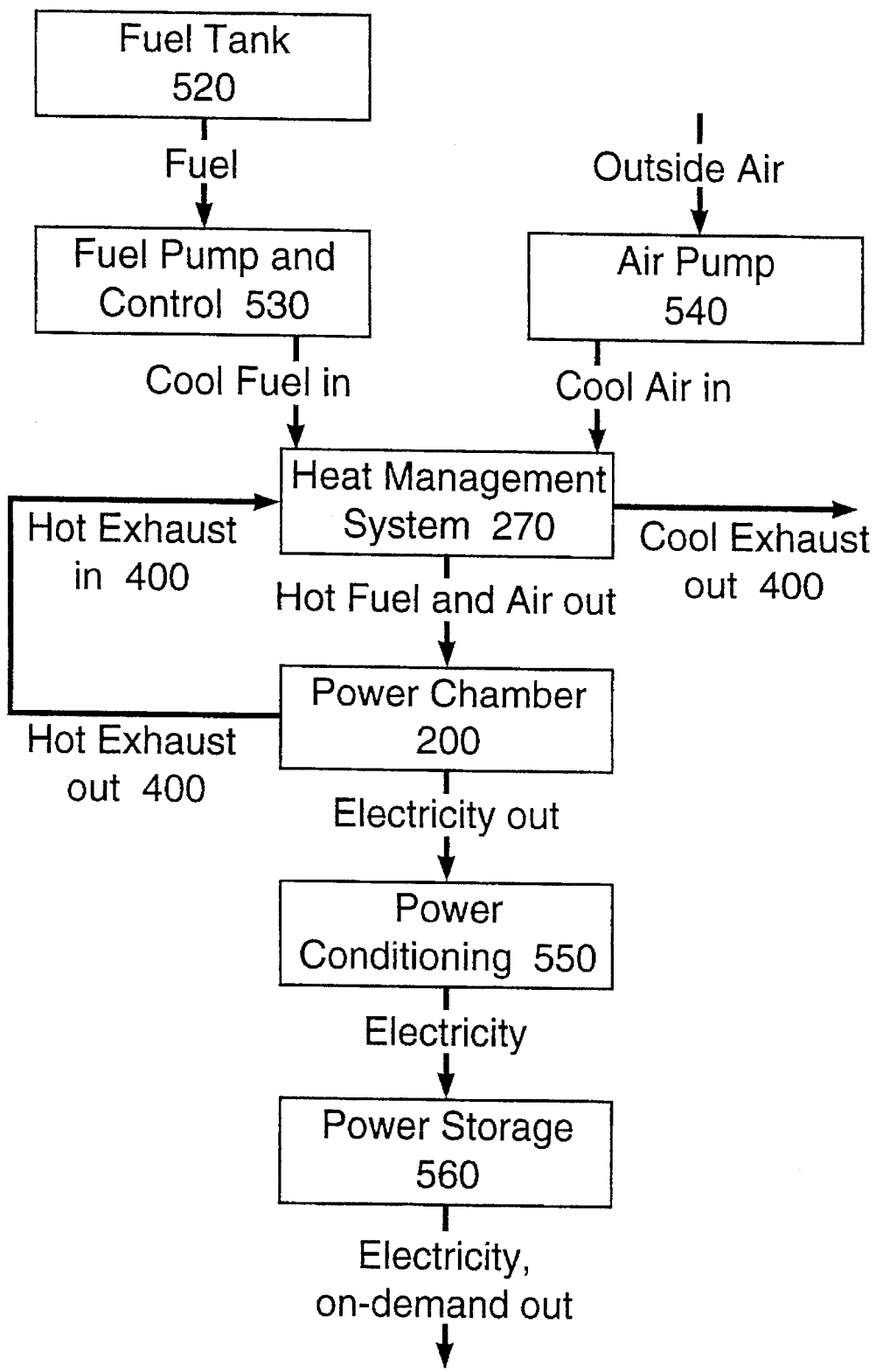
FIG. 10 is a flowchart of the basic operations of the TPV power source showing the system described in FIG. 9.

FIG. 10 is a flowchart showing the interaction of all components of the TPV power system 600. The fuel tank 520 provides the fuel to a fuel pump 530, which pumps cold fuel to the heat management system (heat recuperator 270). Likewise, the air pump 540 draws in air and pumps the cool air into the heat management system 270. The heat management system is comprised of the heat recuperator 270, using excess heat from exhaust gases 400 to preheat the fuel and air, moving cooled exhaust 400 out of the system 600. The preheated fuel and air are forced into the heat source reactor chamber 210 of the power chamber 200, which expels hot exhaust 400 back to the heat recuperator 270. The power chamber 200 produces electricity which is routed through the power conditioner 550, and then to the power storage device 560. The portable or hand-held device being powered by the TPV power source 600 would draw power from power storage 560 on demand.

Figure 11:
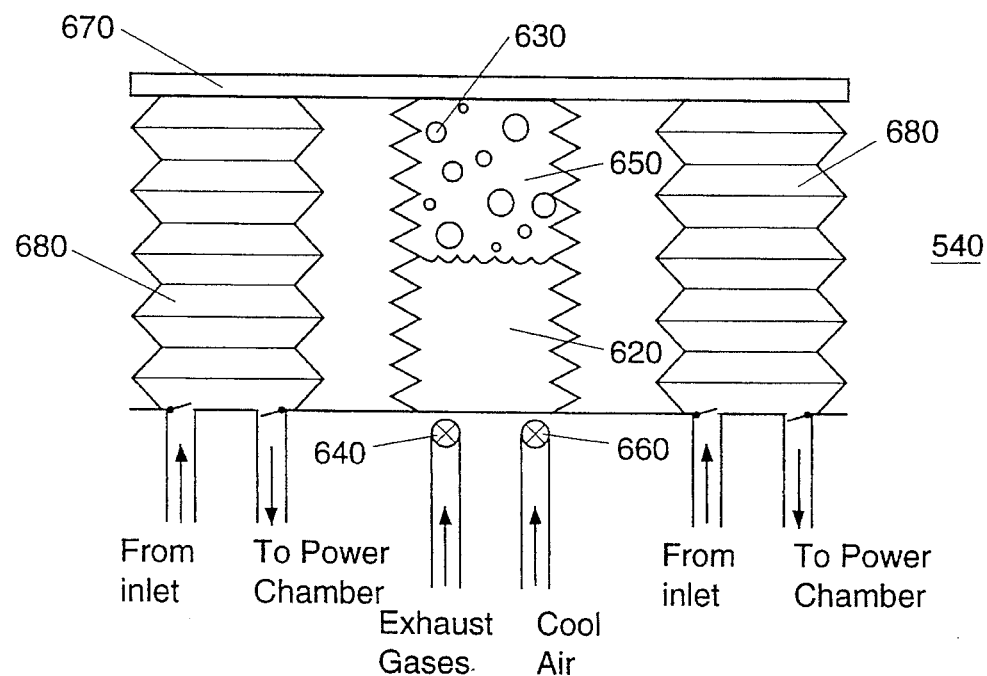
FIG. 11 is an elevational cross-section view of an air pump for moving air to the heat source chemical reactor of FIG. 3.

FIG. 11 is an illustration of an air pump 540 as envisioned in a preferred embodiment of the present invention. A substantial amount of air must be moved through the system 600 to provide the oxygen needed for combustion in the reactor chamber 210. While a fan might work, it is envisioned in a preferred embodiment that miniature bellows 540 will be used. Bellows are quiet and efficient devices for moving air. The air in the TPV system actually serves a dual purpose. First, the air supplies the oxidant for reactor chamber 210 combustion. Second, the air acts as a coolant. The cooling property is essential if the TPV power source is to work in portable and hand-held devices.

The approximately 10 cc of air flow per second required for combustion will be insufficient to cool the exhaust gases 400. Therefore, a series of bellows 540 will be used to supply a total of around 40 cc of air to reduce exhaust gas 400 temperatures to a tolerable level.

A single bellows air pump 540 in FIG. 11 illustrates the structural features of the design. In a preferred embodiment, the air pump 540 takes advantage of waste heat and a series of microvalves 640 and 660. A working fluid 620 that condenses at room temperature but easily converts to gas is sealed in a partially collapsed liquid bellows 630. Hot exhaust gases 400 are routed by a microvalve to heat the fluid 620, which expands inside the bellows 630. The working fluid 620 will turn to gas 650 when heated by exhaust gases 400 which are only 100 degrees Celsius, which is significantly lower than the 1400 degree operating temperature of the reactor chamber 210. When the sealed liquid bellows 630 expands, it forces a bar or plate 670 at the top of the bellows 630 to also rise. This bar or plate 670 is connected at both ends to the top surface of air bellows 680. When the bar or plate 670 rises because of pressure from the liquid bellows 630, the two air bellows 680 are also forced to rise and fill with air. When the sealed liquid bellows 630 is fully inflated, the microvalve 640 cuts off the exhaust gases 400, and a second microvalve 660 opens to enable the flow of cool air, from the environment, to flow over the bellows 630 and condense the working fluid 620. The air bellows 680 then force air into an air inlet, some of which will be siphoned off to cool another expanded sealed liquid bellows.

This air pump design is very energy efficient because it draws almost no power from the system 600, but instead utilizes heat that is otherwise considered waste heat to create mechanical motion to drive air into the combustion chamber.

Another feature of the design in FIG. 11 is that the use of two air bellows allows a balanced rise and fall of the bar or plate 670. The height to which the bellows must rise to get a certain volume of air flow is thus decreased because of the additional air flow from using two air bellows.

The bellows consist of very thin and flexible material. They do not need high strength because the mass of air to be moved is about 0.01 grams per second and the pressure difference for less than one atmosphere. A bellows bladder of nearly zero mass can thus move the required air mass. A suitable material in a preferred embodiment would be mylar.

Figure 12:
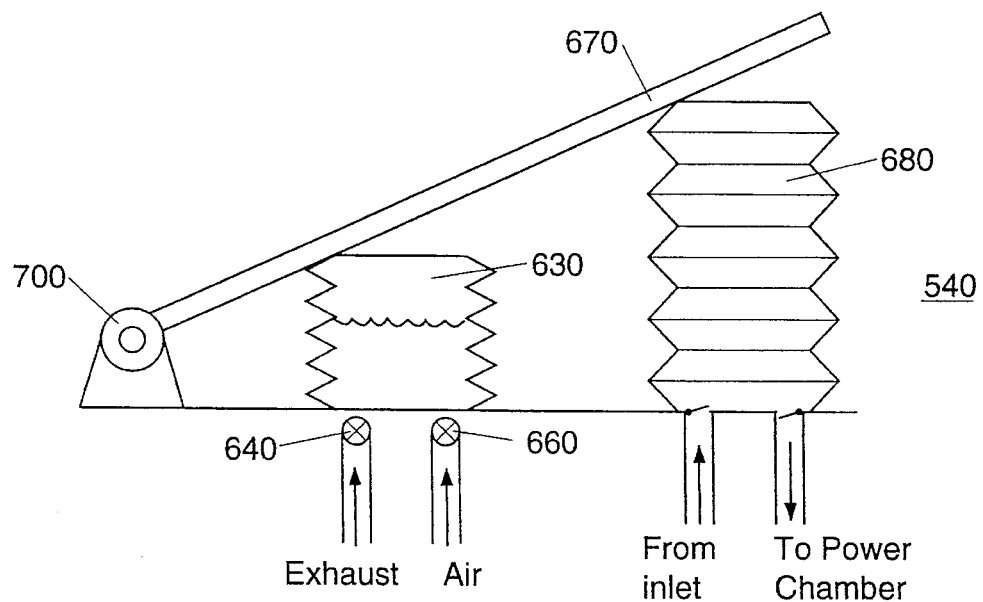
FIG. 12 is an alternative embodiment of the air pump of FIG. 11.

An alternative embodiment of the bellows of FIG. 11 is illustrated in FIG. 12. In this design, a single air bellows is used to move air to the power chamber 200 in a more familiar bellows configuration. The liquid bellows 630 pushes up on a bar 670 connected to the top of an air bellows 680 at the moving end, and to a hinge 700 at a rotatable end. Otherwise, all features and movements of exhaust, cooling air, and inlet air pumped to the power chamber is the same.

Figure 13:
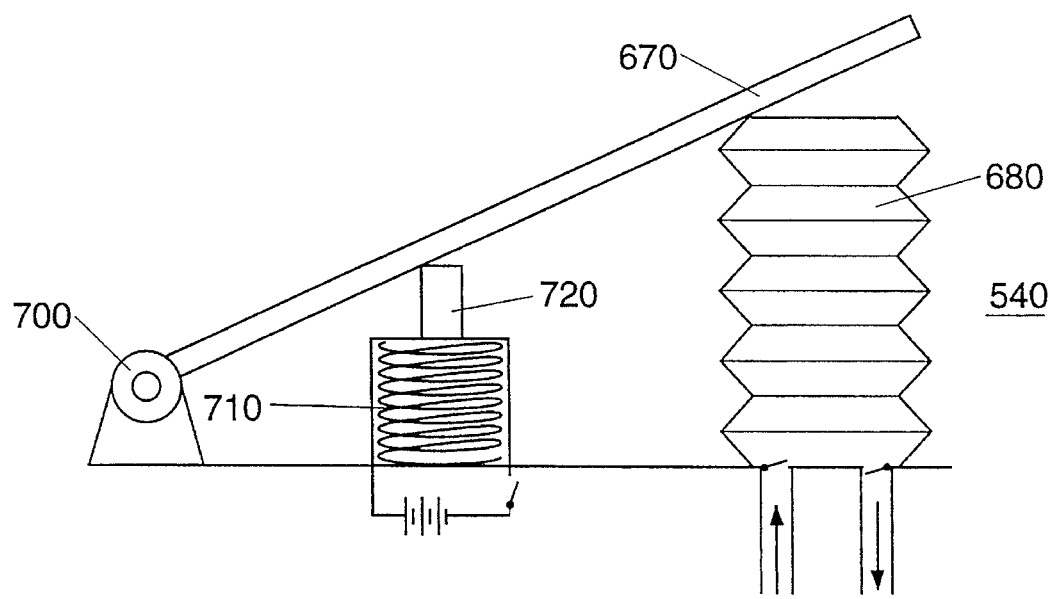
FIG. 13 is an alternative embodiment of the air pump of FIG. 11 that uses magnetic forces to drive the bellows.

FIG. 13 is an alternative embodiment of an air pump 540 using an air bellows 680 that does not use waste heat from exhaust 400. While less efficient, this air pump 540 might be a small "start-up" system that would eventually supplement the main air pump. This alternative would operate effectively as a start-up pump because it operates off electrical power to generate magnetic fields. The electrical power would be taken from the power storage device 560.

The air pump 540 would take the shape of a conventional bellows 680 with a bar 670 attached to a hinge 700 end as shown. The actuator of air pump movement in this device is a solenoid coil 710 and solenoid rod 720. The power through the solenoid coil 710 could be reversed if a driving force was required to help the contraction of the bellows 680. If a driving force is not required, power to the coil 710 is simply removed allowing the solenoid rod 720 to fall back into the coil 710 as the air bellows 680 pushes air into the power chamber.

Figure 14:
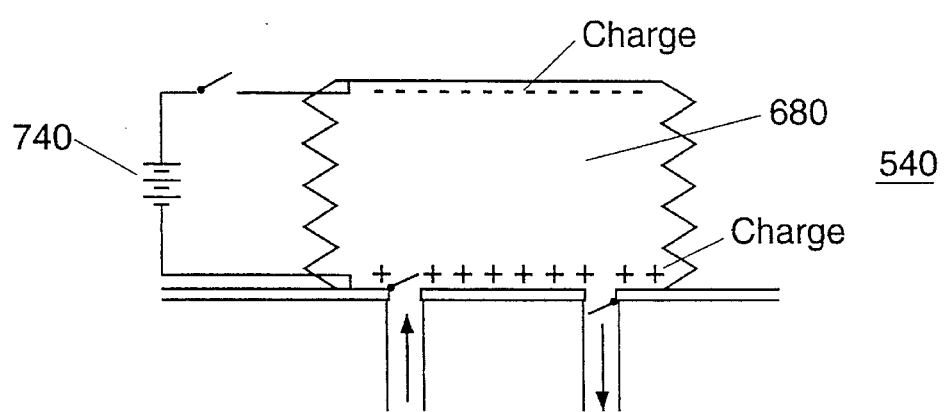
FIG. 14 is an elevational perspective of an alternative embodiment of the air pump of FIG. 11 that uses electrostatic forces to drive the bellows.

FIG. 14 is another alternative embodiment of an air pump 540 using a bellows 680 that does not use waste heat. This design is again less efficient, but this bellows might also be a small "start-up" bellows that would eventually be turned off or allowed to supplement the main bellows. This alternative would operate effectively as a start-up bellows because it operates off electrical power to generate electrostatic charges from energy stored in the power storage device 560.

The bellows 680 would have the shape of flat upper and lower surfaces. Shown here in an edge on view, the inner plane surfaces of the bellows would be coated with a conductor and prevented from electrically touching each other. By attaching a power source 740, the conductive surfaces are charged like capacitors, and caused to repel or attract each other. An attraction force will drive air out of the bellows 680 if it is being used in a start-up mode and the larger waste heat bellows are not yet in operation.

Figure 15:
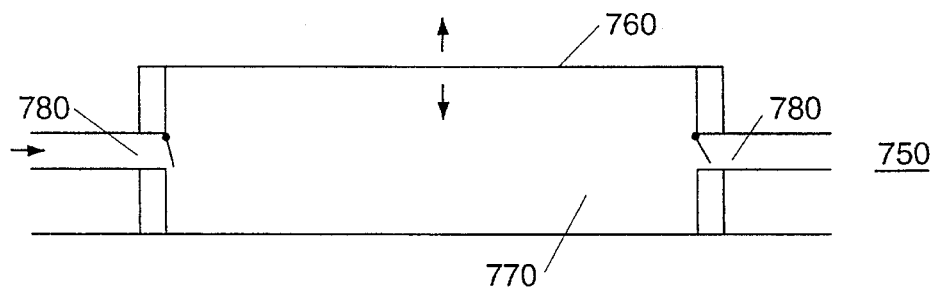
FIG. 15 is an elevational view of a fuel pump for moving fuel into the heat source chemical reactor of FIG. 5.

FIG. 15 is an illustration of a fuel pump 750 in a preferred embodiment of the present invention. The fuel pump 750 is required to pump approximately 0.0006 grams per second of fuel into the heat reactor 210 of the power chamber 200. As envisioned, the pump 750 is a piezoelectrically actuated diaphragm 760. A thin sheet of piezo material 760 can be flexed to draw fuel into a reservoir 770 through a fuel inlet 780. Reversing or removing the electric charge from the material 760 allows the piezo material to flex in the opposite direction, forcing fuel from the reservoir 770. A suitable material for the preferred embodiment is a thin sheet of PZT (lead zirconate titanate).

Figure 16A:
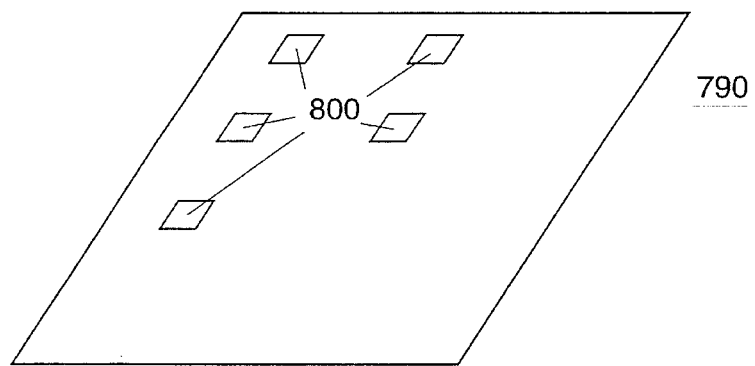
FIG. 16A is a perspective view of a TPV ASIC device with a plurality of TPV burners.

FIG. 16A is an illustration of a planar IC sheet 790 as the present invention appears in an Application Specific Integrated Circuit (ASIC) design. Multiple burners 800 coated with ESCs are formed in the planar surface. The burner dimensions are as described in FIG. 5A where the edge length is given as 1.7 mm, sufficient to produce the 30 watts necessary for a 3 watt electric power output at 10 percent efficiency. With the burners on the silicon wafer is the control circuitry whereby the burners are controlled. That is to say that burners are turned on and off to follow the load demands of whatever device is being powered.

Figure 16B:
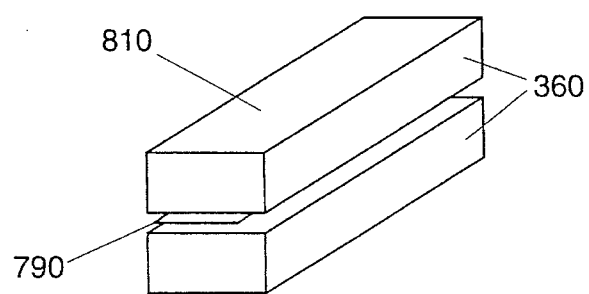
FIG. 16B is a perspective view of an ASIC disposed between an upper and lower super insulator.

FIG. 16B shows a super insulator 360 above and below the planar IC sheet 810. The super insulator 360 is capable of insulating 1000 degree Celsius temperatures from room temperature over dimensions measured in millimeters. The nearly 1400 degree Celsius temperatures of the burner will be easily handled within the confines of the ASIC sheet 810. It is the super insulator's 360 characteristic abilities that will allow the TPV power source 600 to compete with batteries of AAA size.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

We claim:

1. A miniature thermophotovoltaic (TPV) power chamber means for use in portable and hand-held electronic devices, said power chamber means comprising:

an energy source reactor chamber having a fuel inlet, an oxidant inlet, and an outlet for heat and exhaust gases;

a burner element coupled to the outlet of said energy source reactor chamber such that said burner element is heated by a burning of a fuel and an oxidant in said chamber to produce photon energy;

an emissive spectrum converter disposed on an outer face of the burner whereby heat from the burner causes a thermal excitation of said converter such that photon energy is produced in a narrow spectrum;

a transparent protector sheet separated from and locally parallel to the emissive spectrum converter on the outer burner face, said sheet reflecting excess heat energy back to said converter;

a hot exhaust port and shaft disposed between the energy source and the transparent protector sheet, whereby exhaust gases from the combustion of said fuel and said oxidant are expelled from the power chamber;

an array of photovoltaic elements spaced a distance from and parallel to the transparent protector sheet and optically coupled to the spectrum converter, whereby said array generates electricity in response to photon energy from said converter;

a miniaturized air transport means to move air from the ambient surroundings into the power chamber both for the purpose of providing oxygen and for thermal management; and a heat recuperator means coupled to the hot exhaust port and shaft for reclaiming heat energy from the exhaust gases being expelled from the reactor chamber, whereby said exhaust port and shaft is thermally coupled to a fuel line and an oxidant line to (i) preheat said fuel and oxidant in the lines to increase efficiency of the power chamber, and (ii) cool the exhaust gases so that said TPV power chamber may be used in a hand-held device.

2. The TPV power chamber means as defined in claim 1, wherein said chamber further comprises a reflector means for focusing photon energy produced by the emissive spectrum converter on to the array of photovoltaic elements.

3. The TPV power chamber means as defined in claim 2, wherein the reflector means is an optically optimized shaped dish, with a portion of the bottom of the dish being removed so as to create an aperture which is placed over the burner, the dish preventing an escape of photons not otherwise leaving the ESC in the direction of the array of photovoltaic elements by forming another optically optimized shaped cup shape projecting from the burner.

4. The TPV power chamber means as defined in claim 3, wherein the optically optimized shaped dish is a circular dish comprised of a ceramic or metal with an aluminized reflective surface coating an inside surface of the dish.

5. The TPV power chamber means as defined in claim 1, wherein the chamber further comprises a microlens for focusing photon energy produced by the emissive spectrum converter onto the array of photovoltaic elements.

6. The TPV power chamber means as defined in claim 1, wherein the heat source reactor chamber is constructed of materials selected from the group consisting of heat resistant metals, metal alloys, and ceramics.

7. The TPV power chamber means as defined in claim 1, wherein the heat recuperator means further comprises a flat-plate counterflow chimney, said chimney comprising:

the hot exhaust gases shaft as an inner shaft with a plurality of flat sides forming a conduit through which the hot exhaust gases are removed from the power chamber, coupled at a first end to the hot exhaust port and on a second end to a cold exhaust port, said cold port being directed away from the hand-held device;

the oxidant line as an oxidant intake shaft having a plurality of flat sides, wherein said intake shaft surrounds the inner shaft and forms a conduit through which incoming oxidant is preheated by contact with the inner shaft, fed to the reactor chamber, and coupled at a first end to the oxidant inlet and at a second end to an oxidant intake port; and the fuel line comprising a thin hollow shaft protruding from a flat side of the inner shaft and having a rectangular cross section, a smaller side of the rectangle projecting away from the inner shaft and a longer side of the rectangle being parallel to the flat side, wherein the fuel in the fuel line is preheated by contact with the inner shaft, and wherein the fuel line is coupled at a first end to a fuel source and at a second end to the fuel inlet of the reactor chamber.

8. The TPV power chamber means as defined in claim 1, wherein the heat recuperator means further comprises a columnar counterflow chimney, said chimney comprising:

the hot exhaust gases shaft as a columnar inner shaft forming a conduit through which the hot exhaust gases are removed from the power chamber, coupled at a first end to the hot exhaust port and on a second end to a cold exhaust port, said cold port being directed away from the hand-held device;

the oxidant line as a columnar oxidant intake shaft, wherein said shaft surrounds the inner shaft and forms a conduit through which incoming oxidant is preheated by contact with the columnar inner shaft, fed to the reactor chamber, and coupled at a first end to the oxidant inlet and at a second end to an oxidant intake port; and the fuel line comprising a thin hollow shaft covering a portion of the outer circumference of the inner shaft, having a cross section wherein there are two short sides protruding perpendicular from the inner shaft and a longer outer side parallel to the curvature of the inner shaft, and wherein the fuel in the fuel line is preheated by contact with the inner shaft, and wherein the fuel line is coupled at a first end to a fuel source and at a second end to the fuel inlet of the reactor chamber.

9. The heat recuperator means as defined in claim 7 or 8, wherein a common wall of the inner shaft that separates the hot exhaust gases from the fuel is comprised of a thin diamond film for increased transfer of thermal energy between the exhaust gases and the fuel.

10. The heat recuperator means as defined in claim 7 or 8, wherein the inner shaft includes a branch port and shaft coupled to the reaction chamber from a distal end whereby some of the hot exhaust gases are fed back into said chamber.

11. The heat recuperator means as defined in claim 7 or 8, wherein the inner shaft has a plurality of vanes extending from said shaft into the space between the inner and outer shafts at selected distances along the length of the inner shaft and at selected distances around the outer circumference of the inner shaft to thereby increase the exchange of heat energy between hot exhaust gases and the oxidant.

12. The heat recuperator as defined in claim 11, wherein the vanes are comprised of thermally conductive diamond films.

13. The TPV power chamber means as defined in claim 1, wherein the oxidant comprises air.

14. The TPV power chamber means as defined in claim 1, wherein the burner coated with an emissive spectrum converter, the transparent protector sheet, and the array of photovoltaic elements are comprised of thin films.

15. The TPV power chamber means as defined in claim 1, wherein the spacing between the burner and the transparent protector sheet is as small as 1 mm.

16. The TPV power chamber means as defined in claim 1, wherein the spacing between the transparent protector sheet and the array of photovoltaic elements is as small as 1 mm.

17. The TPV power chamber means as defined in claim 1, wherein the reactor chamber produces at least 30 watts of thermal energy.

18. The TPV power chamber means as defined in claim 1, wherein the burner element is as small as 1.7 mm on an edge, and the burner face is approximately square.

19. The TPV power chamber means as defined in claim 1, wherein the fuel is selected from the group consisting of butane, propane, LPG, alcohols, oils, and diesel fuel.

20. The TPV power chamber means as defined in claim 1, wherein the energy source reactor chamber is insulated by a super insulator which can insulate a 1000 degree Celsius temperature against room temperature over a few millimeters.

21. The TPV power chamber means as defined in claim 1, including means for pumping a volume of air pumped to the energy source reactor chamber at at least 9.5 cubic centimeters per second.

22. The TPV power chamber means as defined in claim 1, including means for supplying at least 0.0006 grams per second of fuel to the energy source reactor chamber when the fuel is butane.

23. The TPV power chamber means as defined in claim 1, wherein the energy source reactor chamber is adapted to reach a temperature of at least 1400 degrees Celsius to cause incandescence of the emissive spectrum converter.

24. The TPV power chamber means as defined in claim 1, wherein the energy source reactor chamber is a cylinder, the burner surrounds the reactor chamber, the emissive spectrum converter is disposed on the surface of the burner, the transparent protector sheet surrounds and is spaced a distance from the emissive spectrum converter, and the array of photovoltaic elements surrounds but is not in contact with the transparent protector sheet.

25. The TPV power chamber means as defined in claim 1, wherein the array of photovoltaic elements produces at least 3 watts of electricity.

26. The TPV power chamber means as defined in claim 1, wherein the power chamber further comprises a control means for controlling (i) the flow rate of fuel and oxidant into the energy source reactor chamber, and (ii) the ignition of fuel and oxidant when starting.

27. The TPV power chamber as defined in claim 1, wherein the power chamber operates at at least ten percent efficiency.

28. A miniaturized thermophotovoltaic electrical power system for use in hand-held devices, said system comprising:

a power chamber means for generating electricity wherein thermal energy enables a photon source to provide usable photon energy to a photovoltaic element to generate electricity, said power chamber means having fuel and oxidant inlets and an exhaust gases outlet;

a fuel reservoir for storing a fuel to be used by said power chamber means;

a fuel pumping means for pumping the fuel stored in the fuel reservoir to the fuel inlet of the power chamber means;

an oxidant pumping means for pumping an oxidant to the oxidant inlet of the power chamber means;

a power conditioning means for enabling the system to respond to changing load conditions;

a power storage means for providing power for system start-up, and for providing backup energy reserves while the fuel reservoir is refilled; and a miniaturized air transport means to move air from the ambient surroundings into the power chamber both for the purpose of providing oxygen and for thermal management.

29. The TPV power system as defined in claim 28, wherein the fuel pumping means comprises a thin piezoelectric material stretched over a hollow chamber having a fuel inlet port coupled by a first fuel line to the fuel reservoir, and a fuel outlet port coupled by a second fuel line to the power chamber.

30. The TPV power system as defined in claim 29, wherein the thin piezoelectric material of the fuel pumping means comprises lead zirconate titanate.

31. The TPV power system as defined in claim 28, wherein the oxidant pumping means comprises a bellows.

32. The TPV power system as defined in claim 31, wherein the bellows for drawing in oxidant from outside the hand-held device and pushing it to the TPV power chamber comprises:

an oxidant chamber in the shape of a bellows, resting on a base, having top and bottom surfaces and side walls that stretch and compress the chamber perpendicular to the top and bottom surfaces;

an oxidant inlet port through the base and the bottom surface of the oxidant chamber coupled by a first intake line to an intake port outside the system, only allowing the entry of oxidant into the chamber when the bellows stretches;

an oxidant outlet port through the base and the bottom of the oxidant chamber coupled by a second intake line to the power chamber, only allowing oxidant to leave the chamber when the bellows compresses; and a compression handle coupled at one end to the top surface of the oxidant chamber, and coupled at a rotatable end to a hinge attached to the base and enabling the handle to rotate about said rotatable end, having an actuator means a distal distance from the rotatable end, said actuator means pushing the handle away from the base to force oxidant to be drawn into the chamber, and pulling the handle toward the base to force oxidant out of the chamber.

33. The TPV power system as defined in claim 32, wherein the actuator means comprises:

a circular solenoid coil around a hollow center space, having a top and bottom face, attached at the bottom face to the base and coupled to an energizing means that when energized causes a current to flow in said coil; and a solenoid rod attached at one end to the compression handle and positioned to move in sliding engagement through the center space of the solenoid coil, said rod being magnetically attracted or repelled by the coil depending upon the direction if current flow in said coil, causing the compression bar to rise and draw oxidant into the oxidant chamber from outside the hand-held device, or to fall and force oxidant from the chamber and into the power chamber means, depending upon magnetic attraction between the coil and rod.

34. The TPV power system as defined in claim 31, wherein the bellows for drawing in oxidant from outside the hand-held device and pushing it to the TPV power chamber comprises:

an actuator means attached at a bottom face to a base, and at a top face to a midpoint of a handle;

a first oxidant bellows attached at a bottom face to the base, and at a top face to a first end of the handle, having an inlet and an outlet port through the bottom face and base, enabling oxidant to flow into the first bellows through the inlet port when the handle rises, and enabling oxidant to flow out through the outlet port when said handle falls; and a second oxidant bellows attached at a bottom face to the base, and at a top face to a second end of the handle, having an inlet and an outlet port through the bottom face and base, enabling oxidant to flow into the first bellows through the inlet port when the handle rises, and enabling oxidant to flow out through the outlet port when said handle falls.

35. The TPV power system as defined in claim 34, wherein the actuator means comprises a bellows filled with a working fluid, said working fluid which when heated quickly turns to gas and expands the bellows forcing the handle to rise, and which when cooled quickly turns to liquid and allows the bellows to compress and enabling the handle to fall.

36. The TPV power system as defined in claim 31, wherein the bellows for drawing in oxidant from outside the hand-held device and pushing it to the TPV power chamber comprises an oxidant bellows attached at a bottom face to a base, having an inlet and an outlet port through the bottom face and base, enabling oxidant to flow into the bellows through the inlet port when the bellows rises, and enabling oxidant to flow out through the outlet port when the bellows falls, wherein an inside surface of the bottom face and an inside surface of a top face are coated with an electrical conductor such that when the inside surfaces are electrically charged, the bellows expands and compresses.

37. The TPV power system as defined in claim 36, wherein the inside surfaces of the bellows are coated with a conductor.

38. The TPV power system as defined in claim 31, wherein the oxidant pumping means comprise mini- or micro-bellows.

39. The TPV power system as defined in claims 31, 32, 34, 35 or 36, wherein the bellows is comprised of mylar.

40. The TPV power system as defined in claim 28, wherein the system further comprises a plurality of TPV power chambers on a single application specific integrated circuit which are coupled together for increased electrical power output.

41. The TPV power system as defined in claim 40, wherein the system further comprises a control means for controlling (i) the flow rate of fuel and oxidant into the plurality of heat source reactor chambers, and (ii) the ignition of fuel and oxidant when starting.

42. The TPV power system as defined in claim 28, wherein the system has a virtually infinite shelf life.

43. A method for generating electricity from a miniaturized thermophotovoltaic (TPV) power chamber for use in a TPV power source for powering portable and hand-held devices, said method comprising the steps of:

(a) providing a heating means to raise the temperature above the auto-ignition point of a fuel in the presence of an oxidant;

(b) providing a photon source reactor chamber to provide photons;

(c) placing a protective locally planar sheet between the photon source and a photovoltaic array placed parallel to the photon source for receiving photon energy;

(d) directing the photons towards the photovoltaic array;

(e) providing electrical contacts and attaching them to the photovoltaic array to provide electricity;

(f) providing a heat recuperator for reclaiming heat from exhaust gases produced by the reactor chamber, and preheating a fuel and oxidant fed to said chamber to increase power chamber efficiency; and (g) surrounding the power chamber with a super insulator to increase chamber efficiency and to enable the chamber to be placed in hand-held devices.

44. The method as defined in claim 43, wherein the step of directing photons is enhanced by:

(a) providing a reflector dish between the photon source and the protective sheet so as to help focus photon energy from the photon source towards the photovoltaic array; and (b) providing a microlens between the protective sheet and the photovoltaic array to further focus photon energy onto the array.

45. A method for generating electricity from a miniaturized thermophotovoltaic (TPV) power source for powering portable and hand-held devices, said method comprising the steps of:

(a) providing a TPV power chamber comprising a starter means, a heat source reactor chamber, a burner, an emissive spectrum converter, a reflector dish, a protective sheet, a microlens, a photovoltaic array, a heat recuperator, and a super insulator;

(b) providing a fuel reservoir and fuel pump for drawing fuel from said reservoir and pumping it to the power chamber;

(c) providing a system of mini- or micro-bellows for drawing oxidant from outside the system and pushing it into the power chamber;

(d) providing a power storage means for storing electrical energy produced by the power chamber; and (e) providing a power conditioner for controlling the production of electricity as load demands fluctuate.

46. A method for providing a miniaturized power source that can provide more electrical power for a greater amount of time than conventional batteries, and be used in portable and hand-held devices, said method comprising the step of providing a miniaturized thermophotovoltaic (TPV) power source with a high effective energy density, and surrounded by a super insulator such that the power source is cool to the touch when in use or when in operation.

47. The method as defined in claim 46, wherein the step of replacing conventional batteries by the TPV power source insulated by a super insulator further comprises the step of using air to cool exhaust gases of the TPV power source, as well as to provide an oxidant for a fuel used by said power source.

48. The method as defined in claim 47, wherein the step of using air to cool exhaust gases further comprises the use of mini- or micro-bellows and microvalves to pump air into and out of the TPV power source.

49. The method as defined in claim 48, wherein the step of replacing conventional batteries further comprises the step of providing at least 3 watts of electrical power from the TPV power source.

50. The method as defined in claim 48, wherein the step of replacing conventional batteries with a TPV power source comprises the further step of providing a TPV power source that is at least ten percent efficient in conversion of thermal heat energy to electricity.

51. The method as defined in claim 47, wherein the step of using air to cool the exhaust gases comprises the further step of using diamond coated thin films to increase heat transfer between air and exhaust gases.

* * * * *